Sept. 27, 1966   R. E. ALSCH   3,274,859
TORQUE SWITCH FOR VARIABLE SPEED TRANSMISSIONS
Filed Nov. 13, 1963   2 Sheets-Sheet 2

INVENTOR
RICHARD E. ALSCH
BY Bayard H. Michael
ATTORNEY

United States Patent Office 3,274,859
Patented Sept. 27, 1966

3,274,859
TORQUE SWITCH FOR VARIABLE SPEED TRANSMISSIONS
Richard E. Alsch, Lannon, Wis., assignor to Graham Transmissions, Inc., Menomonee Falls, Wis., a corporation of Delaware
Filed Nov. 13, 1963, Ser. No. 323,428
12 Claims. (Cl. 74—796)

This invention relates to improvements in variable speed transmissions of the type employing a group of inclined longitudinally tapered planetary rollers, intermediate the input and output shafts, and a non-rotatable encircling control ring adjustable lengthwise with respect to the rollers to regulate the planetary action and thus vary the speed and direction of rotation of the driven shaft. In particular, this invention pertains to a mechanism, hereinafter referred to as a torque switch, which is capable of varying the torque transmission capability or torque rating of the transmission in response to a predetermined change in the rotational speed of the planetary rollers.

The rotational speed of the planetary rollers is dependent upon the speed of rotation of the input shaft and upon the fore and aft position of the control ring. The torque rating of the transmission is determined by the contact pressure between the planetary rollers and the control ring, with which they are in rolling contact whenever the input shaft is rotated. When the load on the output shaft is above the torque rating, the planetary rollers will slow down and slip on the control rings. Thus, the rotational speed of the planetary rollers will change when changing the speed of the input shaft (as at times of start up), when changing the output speed (by moving the control ring), and when loading the output shaft beyond the torque rating of the transmission. The basic thought underlying my invention is to utilize any one of the above-described changes in speed in changing the pressure between the planetary rollers and the control ring to thereby vary the torque rating of the transmission accordingly.

In view of the above, the principal object of my invention is to vary the torque rating of a variable speed transmission of the type described by varying the contact pressure between the planetary rollers and the control ring in accordance with a predetermined change in rotational speed of the rollers.

To attain this object, I employ a centrifugal mechanism which is mounted for rotation with the planetary rollers, and by means of which pressure between the rollers and the control ring can either be increased or relieved at a predetermined rotational speed of the former. The significance of the ability to vary this pressure becomes apparent when it is appreciated that most applications of transmissions of this type have a peak or maximum torque requirement only during a very short period in comparison to the total operating time. Most frequently, peak torque is required when starting the equipment, at which time it might be equal to about 150 to 200 percent of the running torque. The transmissions of the prior art had to be designed to have a roller control ring pressure which was sufficient to meet this maximum torque, yet during the majority of operating time, this pressure presented an "extra" and unnecessary load. Further, the planetary type transmission was thought unsuitable for applications having considerably high peak torque requirements, because the roller ring pressure necessary to meet these peaks, although attainable during short periods of time, was too high for continual operation. I have eliminated these drawbacks by providing the high roller ring pressure only at times when high torque output is needed and relieving the same at times of normal operating conditions.

Other objects and advantages will be pointed out in, or be apparent from, the specification and claims, as will obvious modifications of the two embodiments shown in the drawings, in which:

Figure 1:
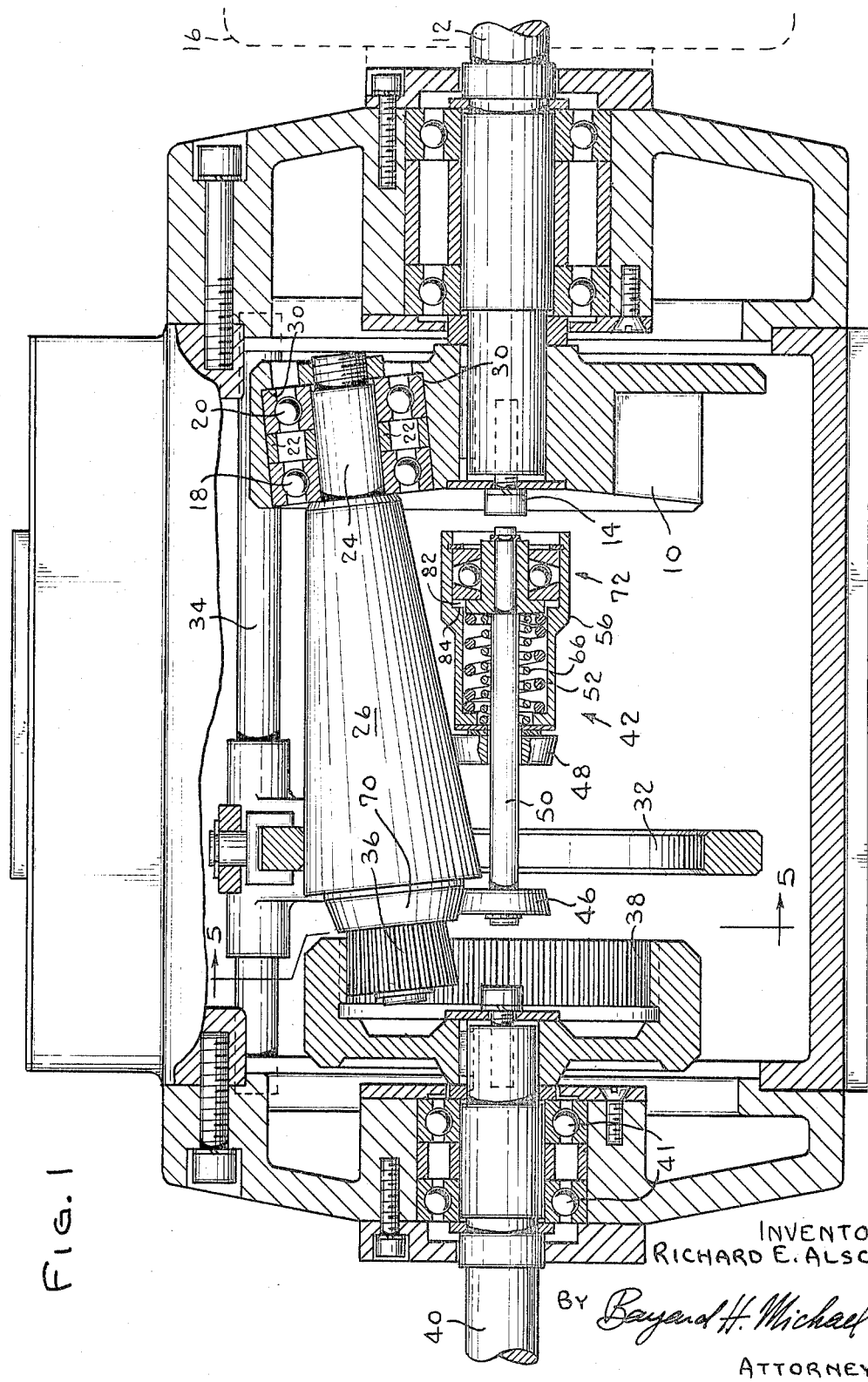
FIG. 1 is a cross-sectional view of a variable speed transmission with two of its planetary rollers being removed to show the torque switch, the switch being of the type capable of producing high torque rating at start up and being shown in the high torque position.

Referring to the drawings in detail, carrier 10 is keyed to the electric motor shaft 12 and retained thereon by bolt 14 to rotate at the speed of the electric motor in housing 16. The carrier is provided with three downwardly inclined bores, each of which receives a pair of bearing assemblies 18 and 20 axially spaced by spacer sleeves 22. Stub shafts 24 on the small end of each planetary roller 26 are mounted in bearing and spacer assemblies to rotate with, and with respect to, the carrier as the carrier rotates. The fit between these parts is such that slight pivotal motion of the planetary roller in respect to the carrier is permitted. Suitable retaining rings (not shown) can be secured to the carrier to hold each bearing and spacer assembly against shoulder 30 of the bore.

The three bores in carrier 10 are inclined with respect to the carrier so that the outer surface of each of the three planetary rollers 26 is parallel to the axis of the carrier and in contact with the inside of axially movable control ring 32. The control ring is movable on axially extending shafts 34 in response to the actuation of a control (not shown) for this purpose.

Pinion gears 36 are mounted on the large end of the planetary rollers to constantly mesh with ring gear 38 fixed on an output shaft 40 rotatably mounted in bearings 41 and projecting through the end of the housing. The rotational speed and direction of rotation of ring gear 38 and output shaft 40 are dependent upon the axial position of control ring 32.

Figure 2:
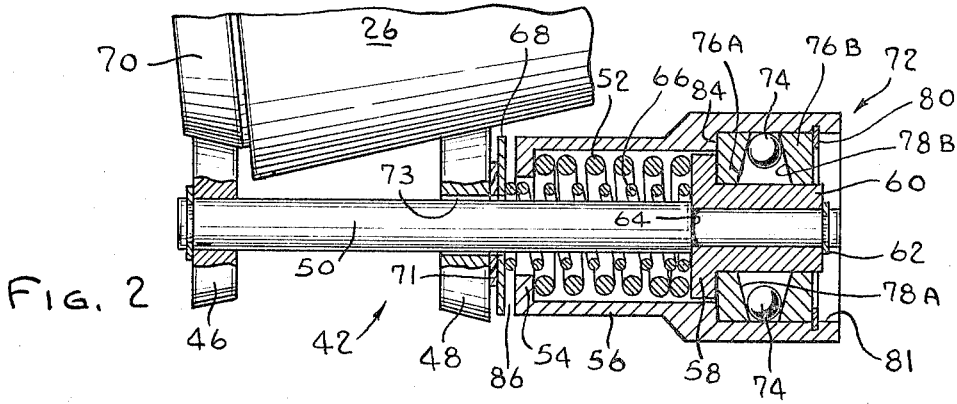
FIG. 2 is a cross-sectional view of the torque switch shown in FIG. 1 when it is in the low torque position.

The torque switch 42 shown in FIGS. 1 and 2 is of the type adapted to reduce the roller control ring pressure at a time when the planetary rollers have reached a predetermined speed. In most applications, this speed of the planetary rollers would be at the level at which the output shaft rotates just under its running speed, thereby rendering the switch capable of providing high torque rating to the transmission when starting up, and of relieving the high pressure just prior to reaching running speed.

The switch is comprised of two oppositely tapered frusto-conical pressure rollers 46 and 48, the former being fixed to shaft 50 on which roller 48 is rotatably and axially slidably mounted. The pressure rollers are biased towards each other by a relatively heavy (200 lbs.) main spring 52 positioned between internal flange 54 of housing 56 and flange 58 of bushing 60 fixed to the shaft 50 by retaining ring 62 and shoulder 64. A relatively light (2 lbs.) auxiliary spring 66 extending between flange 58 and washer 68 also exerts a bias on the pressure rollers.

Roller 46 engages nose portions 70, and roller 48 engages the tapered faces (opposite to the taper of the nose portion) of the planetary rollers 26. The spring forces of both springs are transferred through rollers 46, 48 and 26 to control ring 32, thereby establishing a predetermined contact pressure which is determinative of the torque rating of the transmission.

The ratio of the contact diameters between pressure roller 46 and nose portion 70 is equal to the ratio between the contact diameters of pressure roller 48 and planetary roller 26. For this reason, any rotary motion of the planetary rollers will cause both pressure rollers to rotate at the same speed, and the torque switch will rotate as a unit without any relative rotational movement of one of its parts in respect to another. However, a chance exists that unfavorable stacking of manufacturing tolerances might cause a deviation from the required contact diameter ratio, which deviation will cause slight rotation of pressure roller 48 in respect to the torque switch assembly. In order to reduce the slight drag which would be caused by such relative rotation, I provide an antifriction plastic washer 71 between the outside face of pressure roller 48 and washer 68.

It is also of note that pressure roller 48 and washers 68 and 71 have a central aperture of a larger diameter than the shaft 50, thereby providing a clearance 73 and avoiding the possibility of any drag at this point because of the relative rotation between the parts which might occur in the instance referred to above. Pressure roller 48 is supported in this position by the three planetary rollers 26, and the washers are prevented from movement against the shaft by the frictional force between the parts resulting from the pressure exerted by auxiliary spring 66.

A centrifugal mechanism 72 is mounted for rotation with the torque switch assembly. It is comprised of a plurality of steel balls 74, fully encircling the bushing 60, and a pair of ring shaped cams 76A and 76B positioned on each side of the balls with radially tapered faces 78A and 78B in contact with the balls and providing a radially outwardly converging contour. Both cams are in sliding contact (axially) with bushing 60 and bore 81 of the housing, yet cam 76A is positioned against flange 58 of the bushing and restrained from movement in respect thereto, and cam 76B is positioned against retainer ring 80 and thus restrained from movement in respect to the housing.

Upon rotation of the torque switch, the centrifugal forces of balls 74 will act through cams 76A and 76B resulting in a force in the axially outward direction (to the right in FIG. 1) acting on retainer ring 80, and an equal force in the opposite direction acting on flange 58.

When the torque switch has attained a speed at which the centrifugal forces of the balls 74, when acting through cams 76A and 76B, exceed the spring force of the main spring 52, the balls will move radially outwardly causing a corresponding axial outward movement of the housing 56 in respect to the torque switch assembly. This relative movement of the housing compresses main spring 52 against bushing 60, thereby removing the effect of the spring upon the pressure rollers and, of course, correspondingly reducing the roller control ring pressure. The relative axial movement of the housing as well as the locking out or removal of the main spring is best illustrated by gap 82 (FIG. 1), between shoulder 84 and cam 76A, present when the torque switch is in the high torque position. The gap has been closed, and a gap 86 of equal width has been created between the housing 56 and washer 68 associated with pressure roller 48.

The action of the centrifugal mechanism 72 in no way affects auxiliary spring 66, and therefore it continues to exert a nominal bias on the pressure rollers after the locking out of the main spring, which pressure maintains the pressure rollers in the same location in respect to the planetary rollers. The auxiliary spring, of course, also affects the roller control ring pressure; however, the spring can be of very nominal size if the pressures between the planetary rollers and the control ring created by the centrifugal forces of the planetary rollers are thought sufficient for the particular running torque requirements of the transmission.

Figure 3:
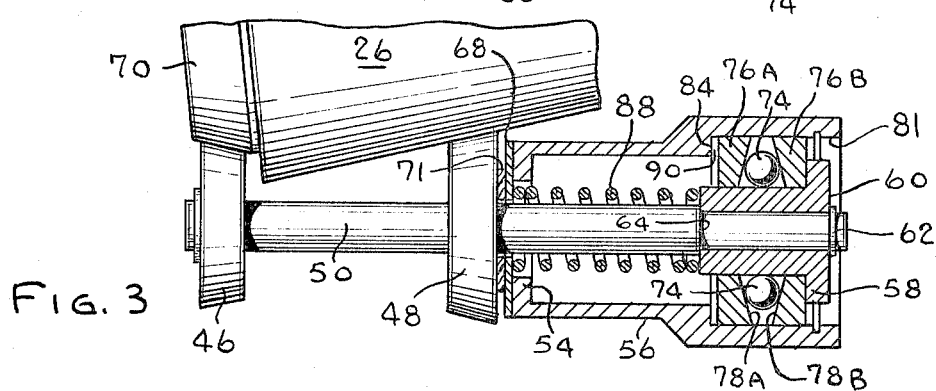
FIGS. 3 and 4 are cross-sectional views of a torque switch in the low and high position, respectively, the switch being of the type capable of producing high torque rating at high speed.
Figure 4:
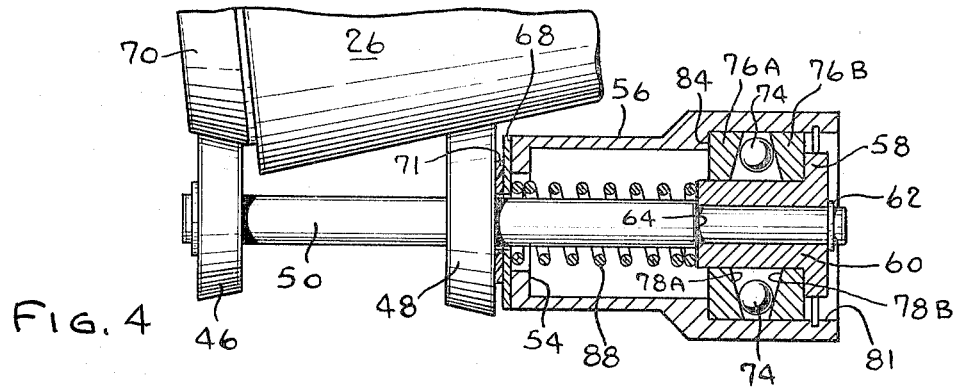
Figure 5:
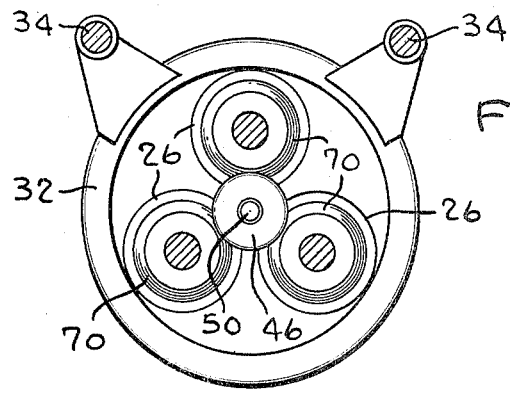
FIG. 5 is a schematic end view of the planetary rollers, torque switch, and control ring assembly.

The torque switch shown in FIGS. 3 and 4 is adapted to increase the roller control ring pressure after the planetary rollers have attained a predetermined speed. As illustrated, the switch shown in FIGS. 1 and 2 has been modified by inverting bushing 60, removing main spring 52, and removing retainer ring 80 from bore 81 of the housing.

Spring 88 is comparable to auxiliary spring 66 and can be of any size which is thought suitable for low torque output of the transmission. As the transmission is started up, or during its low speed operation, only spring 88 is operative to affect the roller control ring pressure. As the rotational speed is increased, balls 74 will move radially outwardly against cams 76A and 76B, spreading them apart to close gap 90, and thereby causing the centrifugal forces of the balls to create a resultant axial force in the inward direction (to the left in FIG. 4) against shoulder 64 of the housing and an equal, but opposite, axial force against flange 58 of the bushing. These forces are, of course, transferred by the torque switch components to the pressure rollers and thus cause them to provide a corresponding increase in the pressure exerted on the planetary rollers.

The embodiment shown in FIGS. 3 and 4 is generally intended for applications which do not have the usual high torque starting requirements, but which call for considerable torque rating during operation. Applications of this type are for equipment which is started up under a light or no load condition and which is loaded once the equipment has attained full running speed. To attain the high torque rating required at operating speeds, a correspondingly heavy spring would normally be required to bias the pressure rollers towards each other. In prior pressure roller assemblies of this type, which did not incorporate the centrifugal mechanism, the required heavy spring created planetary roller control ring pressures which prevented axial movement of the control ring while the transmission was stationary. Because a great portion of this pressure is removed at the stationary position when using the modified switch, the control ring is easily movable and thereby renders the output speed and direction of rotation adjustable before starting up the equipment.

Since the actuation of either modification of the torque switch is solely dependent upon the speed of rotation of the planetary rollers, the switch can be adapted to be either input speed responsive or output speed responsive. By designing the centrifugal mechanism to be actuated a relatively long period before the output shaft has reached a running speed, for all practical purposes the switch will be only input responsive, since the change in rotational speed of the planetary rollers caused by overloading of the output shaft will generally not be sufficient to cause actuation of the switch. In applications where high torque starting is required, it is generally preferred to provide a torque switch which is input responsive, because otherwise the operator of the equipment might be tempted to continually operate the equipment at an overload, thereby causing the transmission to continually run at high roller control ring pressure which would result in a rapid breakdown of the transmission.

However, in cases where continued overload conditions are not anticipated, the centrifugal mechanism can be designed to be actuated very close to the intended running speed, in which case the nominal reduction in planetary roller speed because of slippage would be sufficient to cause actuation and the resulting increase in roller control ring pressure.

Although but two embodiments of the present invention have been illustrated and described, it will be apparent to those skilled in the art that various changes and modifications may be made therein without departing from the spirit of the invention or from the scope of the appended claims.

I claim:

1. A variable speed transmission having a rotary carrier which is rotated by an input shaft; a plurality of longitudinally tapered planetary rollers having oppositely tapered nose portions and being rotatably mounted in the carrier for rotation with, and in respect to, the carrier;

a motion transmitting member rotatable by each of the rollers; a ring member in contact with the motion transmitting members and connected to an output shaft; and an axially movable control ring encircling the rollers and being in contact with the rollers, whereby the contact pressure therebetween determines the torque output of the transmission, comprising in combination:

a first pressure roller in contact with the nose portions of the planetary rollers, a second pressure roller movable relative to said first pressure roller and in contact with the planetary rollers, spring means exerting a bias on said pressure rollers to establish a predetermined contact pressure between the planetary rollers and the control ring, and centrifugal means associated with said pressure rollers and said spring means and being operable to vary said bias in response to a change in the rotational speed of said planetary rollers to thereby correspondingly vary said contact pressure.

2. The combination according to claim 1 wherein said spring means comprises a plurality of springs and wherein one of said springs is connected to said centrifugal means to be movable between biasing and non-biasing position by said centrifugal means upon a change in the rotational speed of said planetary rollers.

3. The combination according to claim 2 wherein said one of said springs is moved by said centrifugal means to a non-biasing position as the speed of said planetary rollers increases above a predetermined speed.

4. The combination according to claim 1 wherein the ratio of the diameter of the nose portion to the diameter of the first roller is equal to the ratio of the diameter of the planetary rollers at point of contact with said second roller and the diameter of said second roller.

5. The combination according to claim 4 wherein one of said pressure rollers is fixed to a shaft and wherein the other of said pressure rollers is mounted for axial and rotational movement on, and in respect to, said shaft.

6. The combination according to claim 5 wherein said bias is exerted to one of the faces of said other of said pressure rollers.

7. The combination according to claim 6 wherein said other of said pressure rollers has anti-friction means in contact with said one of its faces.

8. Variable speed transmission having an input member and an output member, a control ring, and a plurality of longitudinally tapered planetary rollers which are encircled by the control ring and are in rolling contact therewith during rotation of the input member, the planetary rollers being connected to the input and output members to transfer rotational movement of the input member to the output member in accordance with the position of the control ring in respect to the planetary rollers, comprising in combination:

biasing means which normally exerts an outward bias on the planetary rollers and which is movable to a position at which such outward bias is reduced, and means responsive to an increase in the input speed of the transmission as the input speed is increased from a relatively slow speed to a normal running speed, said responsive means being connected to said biasing means to move said biasing means to said position at which said outward bias is reduced before the input speed has reached said normal running speed.

9. A variable speed transmission according to claim 8 wherein said biasing means and said responsive means comprise an assembly which is supported by said planetary rollers and wherein said biasing means includes roller means which is in contact with said planetary rollers and which is rotated by said planetary rollers at a peripheral speed equal to that of said planetary rollers to thereby rotate said assembly at a speed proportional to the speed of said planetary rollers and to thus avoid any significant relative rotational movement between said biasing means and said responsive means.

10. The combination according to claim 1 wherein said first and second pressure rollers, said spring means, and said centrifugal means comprise an assembly which is rotated as a unit upon rotation of said planetary rollers without significant relative rotational movement between the above mentioned components of the assembly.

11. The combination according to claim 10 wherein said spring means is composed of first and second spring means, said first spring means being independent of the operation of said centrifugal means and thus exerting a predetermined bias on said pressure rollers independently of the rotation of said planetary rollers, said second spring means being connected to said centrifugal means to be moved thereby between a first position in which said second spring means exerts a bias on said pressure rollers and a second position in which it does not exert such bias.

12. The combination according to claim 11 wherein said second spring means exerts a bias on said pressure rollers before the planetary rollers have reached a predetermined speed and wherein said centrifugal means moves said second spring means to said second position when said planetary rollers have reached said predetermined speed.

References Cited by the Examiner

UNITED STATES PATENTS

| | | | |
|---|---|---|---|
| 1,585,567 | 5/1926 | Sommer | 192—104 |
| 2,099,750 | 11/1937 | Peo et al. | 192—104 X |
| 2,126,508 | 8/1938 | Schmitter | 74—796 |
| 2,193,794 | 3/1940 | Bade | 74—796 |
| 2,403,627 | 7/1946 | Bade | 74—796 |
| 2,448,598 | 9/1948 | Jones | 74—796 |
| 2,678,566 | 5/1954 | Oehrli | 74—230 |
| 2,680,388 | 6/1954 | Lazarowicz | 74—796 |
| 2,986,043 | 5/1961 | Joulmes | 74—230 |

FOREIGN PATENTS 180,683   9/1962   Sweden.

DAVID J. WILLIAMOWSKY, *Primary Examiner.*

J. R. BENEFIEL, *Assistant Examiner.*